April 26, 1949.   T. H. DWYER ET AL   2,468,050
FLUID TESTING DEVICE FOR PLUNGERS AND BARRELS
Filed March 26, 1946
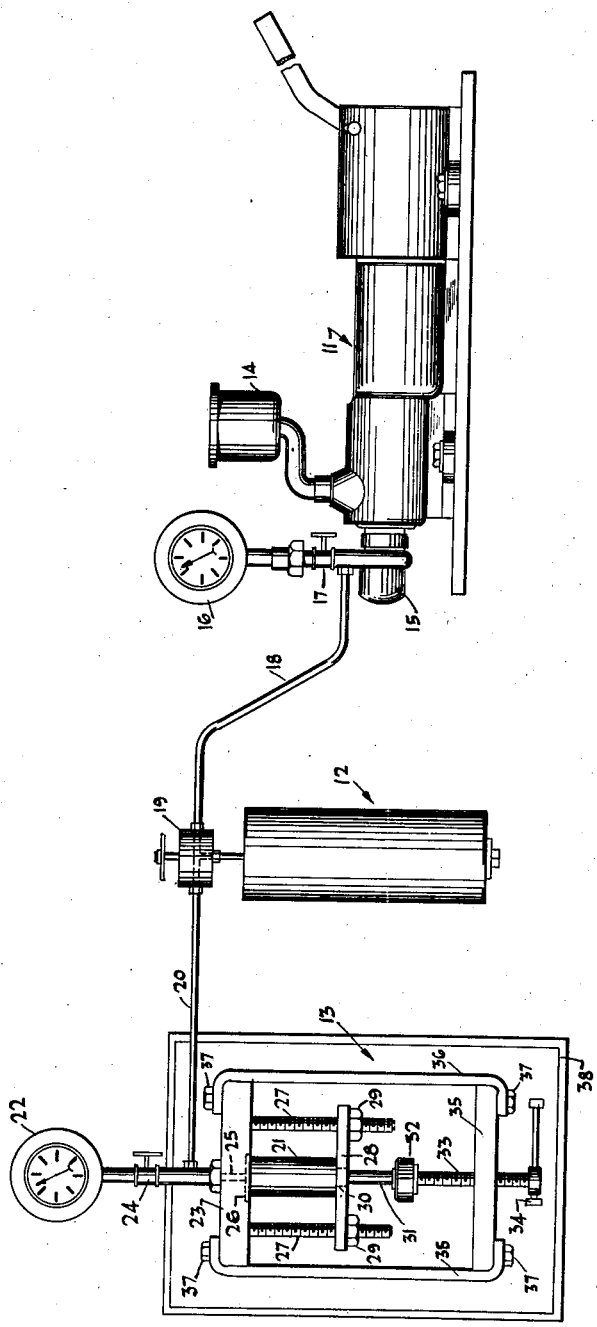
INVENTORS
THEODORE H. DWYER
BY   WILLIAM H. DILDINE
ATTORNEY Patented Apr. 26, 1949

2,468,050

UNITED STATES PATENT OFFICE 2,468,050

FLUID TESTING DEVICE FOR PLUNGERS AND BARRELS

Theodore H. Dwyer and William H. Dildine, United States Navy

Application March 26, 1946, Serial No. 657,313

2 Claims. (Cl. 73—40)

(Granted under the act of March 3, 1883, as amended April 30, 1928; 370 O. G. 757)

This invention relates to a testing device and more specifically to an apparatus for testing the condition of the lapped fit between a hydraulic plunger and barrel.

The present method of testing hydraulic plungers and barrels is by installing them in the device of which they are a part and then applying a test, if possible.

This method has been found to be cumbersome and consumptive of much time. The present invention makes it possible to test a wide range of hydraulic plunger and barrel sizes and types accurately and with a substantial saving in time consumed as compared with the present practice.

It is an object of this invention to provide a hydraulic plunger and barrel testing machine.

Another object is to provide a hydraulic plunger and barrel testing machine to test the condition of the lapped fit of a hydraulic plunger and barrel by measuring the amount of pressure drop caused by leakage of fluid under pressure past the lapped fit.

Another object is to provide a hydraulic plunger and barrel testing machine by the use of a controlled "hydraulic cushion" effect resulting from the use of a high-pressure-fluid storage tank and a three-way rotary valve.

Another object of this invention is to provide a hydraulic plunger and barrel testing machine adaptable for a wide range of plunger and barrel sizes, types and fits.

Further objects and advantages of this invention as well as its construction, arrangement and operation will be apparent from the following description and claims in connection with the accompanying drawing, in which:

The figure is a schematic arrangement of the testing apparatus embodying this invention.

The testing machine consists essentially of a high-pressure-fluid pump 11, a high-pressure-fluid storage tank 12, and a plunger and barrel holding and positioning fixture 13.

The high-pressure-fluid pump 11 is capable of generating a maximum pressure of 10,000 pounds per square inch. Suitably connected to the fluid pump 11 is a fluid-reservoir tank 14. A check valve 15 installed on the forward end of the pump 11 prevents the fluid from leaking back to the pump end of the system. By means of suitable fittings a pressure gauge 16 is connected to the check valve 15 and a cutoff valve 17 is set between the check valve 15 and pressure gauge 16.

A length of high-pressure tubing 18 connects the high-pressure-fluid pump 11 to a three-way rotary valve 19, which is connected to the high-pressure-fluid storage tank 12. Another length of high-pressure tubing 20 connects the three-way rotary valve 19 to the barrel 21, which is to be tested. By means of suitable fittings a pressure gauge 22 is connected to the upper frame member 23 of the holding and positioning fixture 13. A cutoff valve 24 is set between the connection of the high-pressure tubing 20 and the pressure gauge 22. A small hole 25 in the upper frame 23 permits the passage of fluid from the high-pressure tubing 20 to the barrel 21. The upper end of the barrel 21 bears against a soft fibre gasket 26 set in a recess in the upper frame 23. A pair of studs 27 rigidly secured in the upper frame 23 guide an adjustable, barrel-securing yoke 28, which rigidly bears against the lower end of the barrel 21 clamping the barrel 21 between this adjustable, barrel-securing yoke 28 and the upper frame 23 by means of threaded nuts 29. A hole 30 drilled in the adjustable, barrel-securing yoke 28 allows the plunger 31 to fit therethrough. Thrust bearing 32, having a threaded spindle 33 and a handle 34, forces the plunger 31 into the barrel 21. The threaded spindle 33 is in threaded engagement with a threaded hole in the lower frame 35 of the holding and positioning fixture 13. Forming the sides of the holding and positioning fixture 13 are channel-shaped members 36, which are bolted to the upper frame 23 and lower frame 35 by means of bolts 37. A drip pan 38 catches the leakage of fluid from the plunger 31 and barrel 21.

In the operation of the apparatus a hydraulic plunger 31 and barrel 21 having standard operating characteristics are clamped firmly in the holding and positioning fixture 13. The adjustable barrel-securing device 28 bears against the lower end of the barrel 21 by means of threaded studs 27 and nuts 29 in such a manner as to prevent any leakage of fluid under high pressure at the gasketed surface 26. The plunger 31 by means of thrust bearing 32 and threaded spindle 33 is located in the barrel 21 in any known position that allows their lapped surfaces to seal off the fluid under pressure applied at the gasketed end of the barrel 21.

The three-way rotary valve 19 is closed so as to isolate the high-pressure-fluid storage tank 12 from the tubing 18 and 20 connecting the high-pressure pump 11 with the plunger and barrel 31 and 21. Using the pump 11 the system is charged with a selected pressure, which is read on the pressure gauge 16. The pump 11 is then isolated from the system by means of the rotary valve 19 and the decrease in pressure is read on the pressure gauge 22 at regular time intervals. By this means of isolating the pump end of the system the fluid is prevented from leaking thru the check valve 15 due to a faulty seating caused by dirt or other foreign matter; thus, all leakage occurs between the lapped surfaces of the hydraulic plunger 31 and barrel 21. If the rate of fall of the pressure is too rapid for ease of accurate observation, the high-pressure-fluid storage tank 12 is placed in the system by means of the rotary valve 19. Using the pump 11, the oil-storage tank 12 is charged with a selected pressure. By means of the rotary valve 19 the pump 11 is isolated from the system and the portion of the system from the fluid storage tank 12 to the plunger 31 and barrel 21 is opened. The decrease in the pressure is again read on the pressure gauge 22 at regular time intervals and recorded. In this manner, the machine is calibrated for any one type of plunger and barrel.

This calibration consists of the following constant settings and values; the position of plunger 31 in barrel 21, the position of the three-way rotary valve 19, the initial and final pressures read on gauges 16 and 22, and the time required for the pressure to fall from the initial to the final value.

To test a specimen plunger and barrel, a test is applied in the same manner as described above and the constants thus determined compared with those previously determined for a standard plunger and barrel of the same type.

It is to be understood that various modifications and changes can be made in this invention, without departing from the spirit and scope thereof as set forth in the appended claims.

The invention described herein may be manufactured and used by or for the Government of the United States of America for governmental purposes without the payment of any royalties thereon or therefor.

What is claimed is:

1. A device for testing with fluid under high pressure a plunger and barrel, said device comprising a high-pressure pump; a holding fixture including a stationary frame, means for clamping the barrel in said frame with the plunger extending in exposed position, and a movable clamp for engaging the plunger and positioning the plunger in selected position relative to the barrel; a fluid conduit for connecting said pump and said holding fixture for supplying high-pressure fluid to the barrel; a pressure gauge connected to said conduit adjacent said pump; a second pressure gauge connected to said conduit adjacent said holding fixture; a storage tank having a large fluid volume relative to the fluid volume of the remainder of the device; and means for selectively connecting and disconnecting said tank with respect to said conduit between said pressure gauges.

2. A device for testing with fluid under high pressure a plunger and barrel, said device comprising a high-pressure pump; a holding fixture including a stationary frame, means for clamping the barrel in said frame with the plunger extending in exposed position, and a movable clamp for engaging the plunger and positioning the plunger in selected position relative to the barrel; a fluid conduit for connecting said pump and said holding fixture for supplying high-pressure fluid to the barrel; a pressure gauge connected to said conduit; a storage tank having a large fluid volume relative to the fluid volume of the remainder of the device; and means for selectively connecting and disconnecting said tank with respect to said conduit.

THEODORE H. DWYER.
WILLIAM H. DILDINE.

REFERENCES CITED

The following references are of record in the file of this patent:

UNITED STATES PATENTS

| Number | Name | Date |
| --- | --- | --- |
| 983,962 | Werner | Feb. 14, 1911 |
| 1,706,567 | Dezendorf | Mar. 26, 1929 |
| 2,222,079 | Larson | Nov. 19, 1940 |
| 2,323,556 | Mattocks | July 6, 1943 |